April 17, 1951     L. C. GIBSON     2,549,449
CORN-POPPING MACHINE

Filed Feb. 12, 1947     3 Sheets-Sheet 1

INVENTOR.
LESERINE C. GIBSON
BY *Victor J. Evans & Co.*
ATTORNEYS

April 17, 1951     L. C. GIBSON     2,549,449
CORN-POPPING MACHINE
Filed Feb. 12, 1947     3 Sheets-Sheet 2
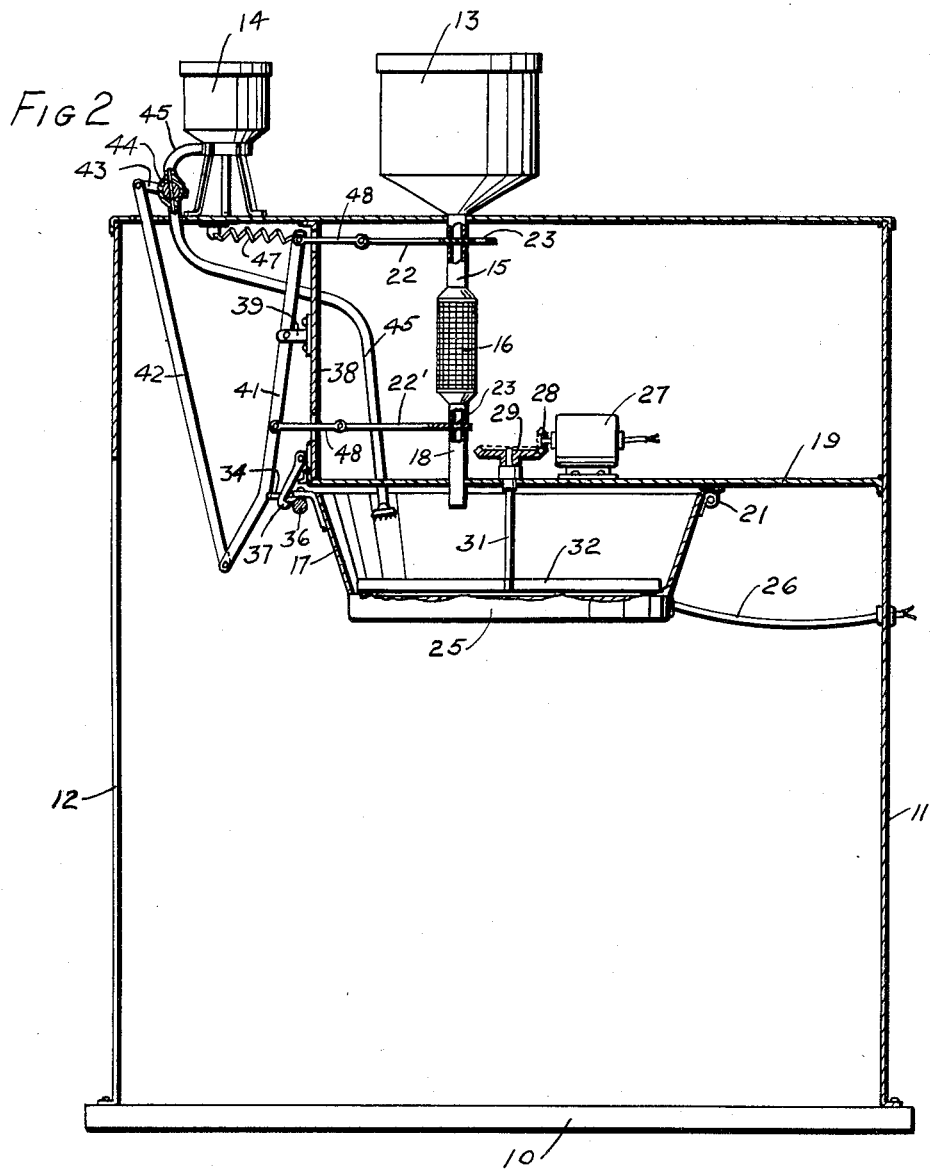
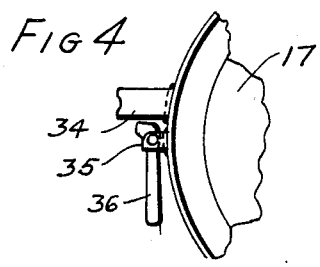
INVENTOR.
LESERINE C. GIBSON
BY *Victor J. Evans & Co.*
ATTORNEYS April 17, 1951 L. C. GIBSON 2,549,449
CORN-POPPING MACHINE
Filed Feb. 12, 1947 3 Sheets-Sheet 3
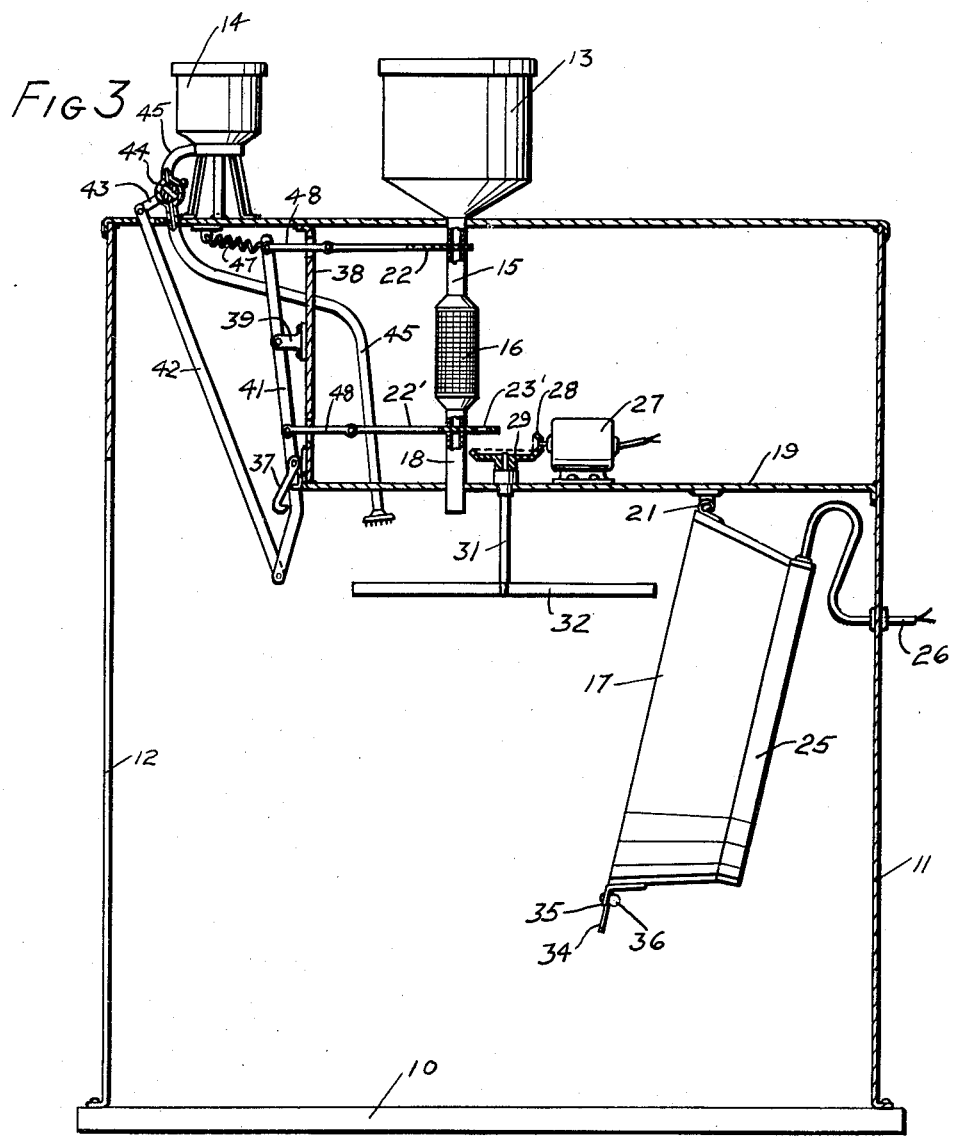
INVENTOR.
LESERINE C. GIBSON
BY Victor J. Evans & Co.
ATTORNEYS Patented Apr. 17, 1951

2,549,449

UNITED STATES PATENT OFFICE 2,549,449

CORN POPPING MACHINE

Leserine C. Gibson, Columbus, Ohio, assignor, by mesne assignments, to Guy R. Martin, Columbus, Ohio Application February 12, 1947, Serial No. 728,081

3 Claims. (Cl. 99—238.4)

This invention relates to corn-popping machines.

It is an object of the present invention to provide a corn-popping machine which can be operated with a minimum of motions at the time of dumping the corn popper and at the time of replenishing the same with new corn to be popped and wherein the various operations are done automatically by the single operation of dropping the corn popper or raising the same.

Other objects of the present invention are to provide a corn-popping machine which is of simple construction, inexpensive to manufacture and efficient in operation.

For other objects and for a better understanding of the invention, reference may be had to the following detail description taken in connection with the accompanying drawing, in which, Fig. 1 is a top plan view of the corn-popping machine including the casing and the associated containers for the corn and seasoning material and with portions broken away to show the catch for securing the popping element in the corn-popping position.

Fig. 2 is a cross-sectional view, in elevation, taken on line 2—2 of Fig. 1 and looking in the direction of the arrows thereof and with the corn popper in the raised position, portions being broken away to show the positions of the valves for the corn and seasoning supply pipes.

Fig. 3 is a view similar to Fig. 2 but showing the corn popper dropped down to discharge the popped corn and also showing the valves in the supply pipes at different positions.

Fig. 4 is a fragmentary and detail view looking in plan upon the catch and projection of the corn popper.

Figure 1:
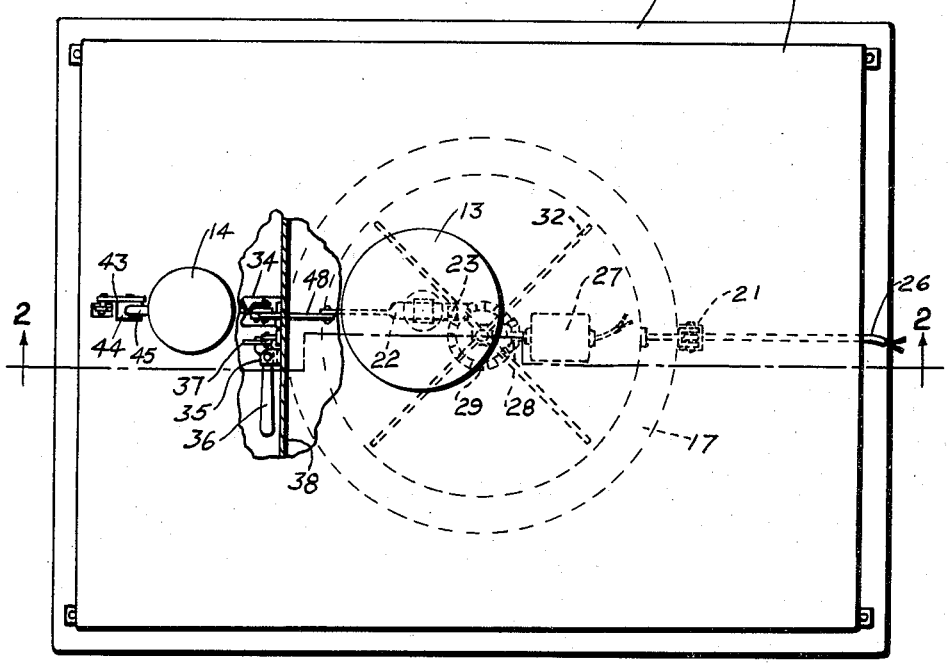
Figure 5:
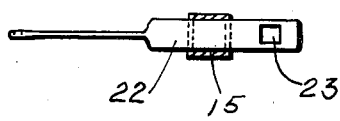
Fig. 5 is a detail plan view of one of the valves in the corn supply tube.

Referring now to the figures, 10 represents a base on which there is mounted a corn casing 11 which may be of transparent material and which will have an opening 12 by which access can be gained to the corn and to the machine parts. On the top of the casing there is mounted a corn supply container 13 and a seasoning material container 14. Depending from the corn container is a tube 15 having a measuring section 16 therein through which corn is passed to measure off the correct amount of the same to be dispensed to the corn-popping element or hopper 17 through the bottom end of the tube 15 as indicated at 18 and which extends below a support member 19 to which the corn-popping element is hinged as indicated at 21.

A valve plate 22 extends into the upper part of the tube 15 and has an opening 23 therein which when brought within the tube will permit the passage of corn to the measuring section 16. A similar valve plate 22' is located in the bottom end 18 of the tube to control the corn leaving the measuring section 16. This valve plate 22' has an opening 23' therein. With the plates 22 and 22' positioned as shown in Fig. 2, corn is being passed through the opening 23' to the corn-popper hopper 17.

The corn-popping hopper 17 has an electric heating device 25 therein which is connected to some power source external of the casing 11 by means of a wire cable 26. Supported upon the member 19 is an electric motor 27 which is connected by its pinion 28 to a bevel plate gear 29 on the upper end of a shaft 31 which extends upwardly through the support 19 and is supported therefrom and which has agitating blades 32 on its lower end adapted to extend over the bottom of the corn popper to effect an agitating motion to the corn within the corn popper to keep the same from burning or becoming scorched.

The corn-popping element 17 can be dropped to the lowered position as shown in Fig. 3 to dispense the popped corn into the casing 11 and upon the base 10. The free edge of the corn-popping element has an extension 34, Fig. 4, and a projection 35 on which a hand latch 36 is pivoted. The latch 36 cooperates with a hook 37, Fig. 2, to retain the corn-popping element in its raised position. The hook 37 is pivotally connected to a vertically extending wall 38 and adapted to swing outwardly therefrom. Also pivotally connected on this vertically extending wall 38 as by means of a bracket 39 is a vertically extending lever 41 adapted to be engaged by the projection 34 on the corn-popping element and to be pivoted in a clockwise direction as the corn-popping element is brought into the raised position. As this is effected the valve plate 22' is arranged so that corn will drop into the popper through its opening 23' and from the measuring section 16. At the same time the valve plate 22 will be so extended as to prohibit the passage of corn from the supply container 13 to the measuring section 16.

The lower end of the pivoted lever 41 is outwardly bent and extended downwardly from the projection 34 to have pivotally connected to the same, a vertically extending link 42 which extends upwardly through the top of the casing 11 and connects with an arm 43 of a valve 44 for controlling the flow of seasoning material from the seasoning material container 14. This valve 44 is in a supply tube 45 which extends downwardly through the top of the casing and over the corn-popping element to supply seasoning material to the freshly popped corn. By retaining the corn-popping element in a raised position after it has been unhooked will maintain the supply of seasoning material to be sure that an adequate amount of the same has been distributed among the kernels of popped corn. As soon as the corn-popping element however is dropped, a tension spring 47 on the upper end of the lever 41 will pivot the lever in a counterclockwise direction until its lower end abuts with the lower end of the vertically extending support 38. The valve plates 22 and 22' are respectively connected to the vertically extending lever 41 by links 48 and at opposite sides of the pivotal connection of the lever 41 with the bracket 39. Accordingly at the same time the opening 23 of the top valve plate 22 will be aligned with the tube 15 to permit a fresh supply of corn from the container 13 to the measuring section 16. The valve plate 22' however will close the lower end 18 of the tube 15. At the same time the valve 14 will be closed so that no more seasoning material will pass to the corn.

The corn-popping element will now assume a position as shown in Fig. 3 and corn will be dispensed from the same to the base 10. As the corn-popping element is raised the projection 34 will engage with the lever 41 to cause its reverse rotation and at the same time corn will be dropped into the popping element and the flow of the seasoning material will be started. This is all automatic merely upon raising the corn-popping element. The latch 36 and the hook 37 will retain the corn-popping element in the raised position.

While various changes may be made in the detail construction, it shall be understood that such changes shall be within the spirit and scope of the present invention as defined by the appended claims.

I claim:

1. In a pop-corn popping machine, the combination which comprises a horizontally disposed popping hopper, a heating element in the bottom of the popping hopper, a housing in which the popping hopper is positioned, a compartment having an end wall and a horizontally disposed bottom extended inwardly from one end of the housing and positioned above the said popping hopper, means hinging the hopper to the under surface of the bottom of the compartment, a corn supply container mounted on the housing, a spout having an enlarged measuring section therein extended from the supply container to the popping hopper, plates providing valves in said spout positioned above and below the said measuring section thereof, a vertically disposed lever pivotally mounted on the end of said compartment, links connecting the lever to the plates, an extension on the said popping hopper positioned to engage an end of said lever for actuating the lever to close the valve above the measuring section of the spout and open the valve below the said measuring section as the popping hopper is returned from a dumping position to the horizontally disposed position, resilient means actuating the said lever to reverse the positions of the said valves as the popping hopper is dropped downwardly to a dumping position, and a latch on the compartment for retaining the popping hopper in the horizontally disposed position.

2. In a pop-corn popping machine, the combination which comprises a horizontally disposed popping hopper, a heating element in the bottom of the popping hopper, a housing in which the popping hopper is positioned, a compartment having an end wall and a horizontally disposed bottom extended inwardly from one end of the housing and positioned above the said popping hopper, means hinging the hopper to the under surface of the bottom of the compartment, a corn supply container mounted on the housing, a spout having an enlarged measuring section therein extended from the supply container to the popping hopper, plates providing valves in said spout positioned above and below the said measuring section thereof, a vertically disposed lever pivotally mounted on the end of said compartment, links connecting the lever to the plates, an extension on the said popping hopper positioned to engage an end of said lever for actuating the lever to close the valve above the measuring section of the spout and open the valve below the said measuring section as the popping hopper is returned from a dumping position to the horizontally disposed position, resilient means actuating the said lever to reverse the positions of the said valves as the popping hopper is dropped downwardly to a dumping position, a latch on the compartment for retaining the popping hopper in the horizontally disposed position, a seasoning container mounted on said housing, a tube extended from the said seasoning container to the popping hopper, a valve in the said tube, and means actuating the said valve by the vertically disposed lever to open the valve as the popping hopper returns to the horizontally disposed position.

3. In a pop-corn popping machine, the combination which comprises a horizontally disposed popping hopper, a heating element in the bottom of the popping hopper, a housing in which the popping hopper is positioned, a compartment having an end wall and a horizontally disposed bottom extended inwardly from one end of the housing and positioned above the said popping hopper, means hinging the hopper to the under surface of the bottom of the compartment, an agitator journaled in the bottom of the compartment and positioned to travel around the lower part of the popping hopper, a motor positioned in the compartment and operatively connected to the agitator, a corn supply container mounted on the housing, a spout having an enlarged measuring section therein extended from the supply container to the popping hopper, plates providing valves in said spout positioned above and below the said measuring section thereof, a vertically disposed lever pivotally mounted on the end of said compartment, links connecting the lever to the plates, an extension on the said popping hopper positioned to engage an end of said lever for actuating the lever to close the valve above the measuring section of the spout and open the valve below the said measuring section as the popping hopper is returned from a dumping position to the horizontally disposed position, resilient means actuating the said lever to reverse the positions of the said valves as the popping hopper is dropped downwardly to a dumping position, a latch on the compartment for retaining the popping hopper in the horizontally disposed position, a seasoning container mounted on said housing, a tube extended from the said seasoning container to the popping hopper, a valve in the said tube, and means actuating the said valve by the vertically disposed lever to open the valve as the popping hopper returns to the horizontally disposed position.

LESERINE C. GIBSON.

REFERENCES CITED

The following references are of record in the file of this patent:

UNITED STATES PATENTS

| Number | Name | Date |
| --- | --- | --- |
| 1,545,357 | Schwimmer | July 7, 1925 |
| 1,789,902 | Jackson | Jan. 20, 1931 |
| 1,808,758 | Bettandorff | June 9, 1931 |
| 2,123,663 | Roach | July 12, 1938 |